(12) United States Patent
Liu

(10) Patent No.: US 12,380,138 B2
(45) Date of Patent: Aug. 5, 2025

(54) DATA TRANSMISSION METHOD AND APPARATUS

(71) Applicant: Shenzhen Yinwang Intelligent Technologies Co., Ltd., Shenzhen (CN)

(72) Inventor: Jianqin Liu, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 253 days.

(21) Appl. No.: 17/852,936

(22) Filed: Jun. 29, 2022

(65) Prior Publication Data

US 2022/0343758 A1 Oct. 27, 2022

Related U.S. Application Data

(63) Continuation of application No. PCT/CN2020/136894, filed on Dec. 16, 2020.

(30) Foreign Application Priority Data

Dec. 31, 2019 (CN) .......................... 201911414536.7

(51) Int. Cl.
*G06F 16/29* (2019.01)
*G08G 1/0967* (2006.01)
*G08G 1/0969* (2006.01)
*H04L 67/10* (2022.01)
*H04L 67/12* (2022.01)

(52) U.S. Cl.
CPC ........... *G06F 16/29* (2019.01); *G08G 1/0967* (2013.01); *G08G 1/0969* (2013.01); *H04L 67/10* (2013.01); *H04L 67/12* (2013.01)

(58) Field of Classification Search
CPC .... G08G 1/0967; G08G 1/0969; G06F 16/29; H04L 67/12; H04L 67/10; H04L 67/52; H04W 4/44
See application file for complete search history.

(56) References Cited

U.S. PATENT DOCUMENTS

| | | | |
|---|---|---|---|
| 10,502,577 B2 * | 12/2019 | Lynch | ............ G08G 1/096716 |
| 2007/0061074 A1 * | 3/2007 | Safoutin | ............ G09B 29/106 |
| | | | 701/431 |
| 2016/0012646 A1 * | 1/2016 | Huang | .................... G06T 19/20 |
| | | | 345/419 |
| 2017/0307398 A1 | 10/2017 | Iwaasa et al. | |
| 2018/0003512 A1 * | 1/2018 | Lynch | ................ G01C 21/3811 |
| 2018/0038695 A1 | 2/2018 | Bitra et al. | |

(Continued)

FOREIGN PATENT DOCUMENTS

| CN | 106885578 A | 6/2017 |
|---|---|---|
| CN | 108093480 A | 5/2018 |

(Continued)

*Primary Examiner* — Rufus C Point
(74) *Attorney, Agent, or Firm* — Leydig, Voit & Mayer, Ltd.

(57) ABSTRACT

A vehicle terminal determines a data format of detection information, where the detection information is associated with a map element. The vehicle terminal sends the detection information to a first network device based on the determined data format. The vehicle terminal receives map element change information sent by the first network device or a second network device, to update an electronic map. The first network device and the second network device each may be a cloud server or a road side unit.

36 Claims, 4 Drawing Sheets

(56) References Cited

U.S. PATENT DOCUMENTS

2018/0083914 A1\* 3/2018 Yamaura ............... H04W 4/027
2019/0228648 A1   7/2019 Moustafa et al.

FOREIGN PATENT DOCUMENTS

| CN | 108268513 A | 7/2018 |
| CN | 109640294 A | 4/2019 |
| CN | 110160544 A | 8/2019 |
| CN | 110287276 A | 9/2019 |
| CN | 110544376 A | 12/2019 |
| JP | 2008164821 A | 7/2008 |
| JP | 2010152418 A | 7/2010 |
| JP | 2014130529 A | 7/2014 |
| JP | 2014170290 A | 9/2014 |
| JP | 2019164840 A | 9/2019 |
| WO | 2018180097 A1 | 10/2018 |

\* cited by examiner

DATA TRANSMISSION METHOD AND APPARATUS

CROSS-REFERENCE TO RELATED APPLICATIONS

This application is a continuation of International Application No. PCT/CN2020/136894, filed on Dec. 16, 2020, which claims priority to Chinese Patent Application No. 201911414536.7, filed on Dec. 31, 2019. The disclosures of the aforementioned applications are hereby incorporated by reference in their entireties.

TECHNICAL FIELD

This application relates to the field of communications technologies, and in particular, to a data transmission method and apparatus.

BACKGROUND

A self-driving vehicle is an intelligent vehicle that implements unmanned driving by using a computer system, and is also referred to as a driverless vehicle, a computer-driven vehicle, or a wheeled mobile robot. The self-driving vehicle relies on collaborations such as artificial intelligence, visual computing, radar, a monitoring device, and a global positioning system, so that a computer can automatically and securely operate a motor vehicle without any human active operation. An automatic driving technology relies on a high-definition electronic map to provide real-time and accurate map data and road condition information. However, data collection, maintenance, and update of the high-definition map consume a lot of manpower, material resources, and financial resources, and collection costs and maintenance and update costs are high.

Crowdsourcing, as a low-cost collection mode, is widely used in recent years. Crowdsourcing is to complete a specific task based on power of the masses, for example, complete map data collection based on a large quantity of vehicles of the masses. In addition, sharing of map data collected through crowdsourcing can also implement data update and maintenance of the high-definition map. However, how to fuse and process original data collected by different types of sensors of different vehicles, and compare the collected data with data corresponding to a current map, to determine change information and the like of an electronic map, is a problem that needs to be resolved currently.

SUMMARY

This application provides a data transmission method and apparatus, so as to resolve problems of fusion and change detection of data collected through crowdsourcing, thereby ensuring reliability of map data update, and reducing complexity of cloud data processing.

To achieve the foregoing objectives, the following technical solutions are used in this application.

According to a first aspect, a data transmission method is provided. The method includes: A vehicle terminal determines a data format of detection information, where the detection information is associated with a map element. The vehicle terminal sends the detection information of the vehicle terminal to a first network device based on the data format. The vehicle terminal receives map element change information sent by the first network device or a second network device.

In the foregoing technical solution, the vehicle terminal collects detection information, and may send detection information in different data formats to the first network device, to detect map element change information. The first network device or the second network device may detect a map element change, and send the map element change information to the vehicle terminal, to update an electronic map. The first network device or the second network device each may be a cloud server or a road side unit, and a map element change may be detected by the vehicle terminal, the cloud server, or the road side unit. This may improve flexibility of data fusion and change detection, and ensure reliability and real-time performance of map data update.

In a possible design, the data format of the detection information includes: a format 1: original information collected by an on-board sensor, or a format 2: target information detected by a single on-board sensor, or a format 3: target information jointly detected by at least one on-board sensor, or a format 4: map element change information corresponding to target information jointly detected by at least one on-board sensor. In the foregoing possible implementation, the detection information sent by the vehicle terminal to the first network device may be configured in a plurality of data formats, thereby improving data processing flexibility and accuracy.

In a possible design, the determining, by a vehicle terminal, a data format of detection information specifically includes: determining, by the vehicle terminal, the data format of the detection information based on confidence of the detection information; or determining, by the vehicle terminal, the data format of the detection information based on a map layer supported by the first network device; or determining, by the vehicle terminal, the data format of the detection information based on a data processing capability of the first network device; or determining, by the vehicle terminal, the data format of the detection information based on a map element type corresponding to the detection information; or determining, by the vehicle terminal, the data format of the detection information based on indication information sent by the first network device, where the indication information is used to indicate the data format of the detection information; or determining, by the vehicle terminal, the data format of the detection information based on a moment for obtaining the detection information. In the foregoing possible implementation, the vehicle terminal may determine the data format of the detection information in the foregoing several different manners, to comprehensively determine the data format of the reported detection information based on device performance or map elements of the vehicle terminal and the first network device, thereby improving data processing flexibility, reducing data processing complexity of the first network device, and improving data update reliability.

In a possible design, the map element change information includes at least one of whether the map element exists, or location information, shape information, color information, and size information of the map element. In the foregoing possible implementation, the first network device or the second network device may detect a map element change based on detection data, to obtain the map element change information, so as to update a map element on an electronic map, and improve data reliability.

In a possible design, the original information collected by the on-board sensor includes at least one of laser point cloud data or pixel data. In the foregoing possible implementation, the original information collected by the on-board sensor may be used to obtain a corresponding map element on an electronic map, to detect a map element change based on the detection information, so as to update the electronic map, and improve data reliability.

In a possible design, the determining, by the vehicle terminal, the data format of the detection information based on a map element type corresponding to the detection information specifically includes: a map element corresponding to the detection information includes a first type and a second type, and when the map element corresponding to the detection information is the first type, determining, by the vehicle terminal, that the data format of the detection information is the format 1, the format 2, or the format 3; or when the map element corresponding to the detection information is the second type, determining, by the vehicle terminal, that the data format of the detection information is the format 4.

In a possible design, the map element of the first type includes at least one of road information, lane line information, traffic light information, road sign information, light pole information, or stop line information. In the foregoing possible implementation, the data format of the detection information is determined based on the map element type corresponding to the detection information. When the map element is a relatively key type, the data format is original data, the format 2, the format 3, or the like. Therefore, the data format of the detection information may be determined based on a priority of the map element type, thereby improving data update reliability.

In a possible design, the first network device is a cloud server or a road side unit.

In a possible design, when the first network device is a road side unit, the receiving, by the vehicle terminal, map element change information sent by the second network device specifically includes: the map element change information is associated with map element change information uploaded by at least one road side unit to the second network device. In the foregoing possible implementation, the at least one road side unit may upload the map element change information to the cloud server, and the cloud server combines the map element change information uploaded by the road side unit in each area, to determine an update status of an electronic map, thereby improving accuracy of data fusion and processing.

In a possible design, when the first network device is a cloud server, the receiving, by the vehicle terminal, map element change information sent by the second network device specifically includes: the second network device is a road side unit, and the map element change information is associated with map element change information uploaded by at least one cloud server to the second network device. In the foregoing possible implementation, the at least one cloud server may upload the map element change information to a road side unit in a corresponding area, and the road side unit combines the map element change information uploaded by the at least one cloud server, to determine an update status of an electronic map, thereby improving accuracy of data fusion and processing.

According to a second aspect, a data transmission method is provided. The method includes: A first network device receives detection information sent by a vehicle terminal, where the detection information is associated with a map element. The first network device determines, based on the detection information, whether a map element corresponding to the detection information is matched, and if the map element corresponding to the detection information is not matched, the first network device obtains map element change information based on the detection information. The first network device sends the map element change information to the vehicle terminal. Alternatively, the first network device sends the map element change information to a second network device, where the map element change information is used by the second network device to determine whether to update an electronic map.

In a possible design, a data format of the detection information received by the first network device and sent by the vehicle terminal is: a format 1: original information collected by an on-board sensor, or a format 2: target information detected by a single on-board sensor, or a format 3: target information jointly detected by at least one on-board sensor, or a format 4: map element change information corresponding to target information jointly detected by at least one on-board sensor.

In a possible design, before the receiving, by a first network device, detection information sent by a vehicle terminal, the method further includes: The first network device sends indication information to the vehicle terminal, where the indication information is used to indicate a data format of the detection information sent by the vehicle terminal. Alternatively, the first network device sends, to the vehicle terminal, a map layer supported by the first network device, to determine a data format of the detection information. Alternatively, the first network device sends a data processing capability of the first network device to the vehicle terminal, to determine a data format of the detection information.

In a possible design, the map element change information includes at least one of whether the map element exists, or location information, shape information, color information, and size information of the map element.

In a possible design, the original information collected by the on-board sensor includes at least one of laser point cloud data or pixel data.

In a possible design, the first network device is a cloud server or a road side unit.

In a possible design, when the first network device is a road side unit, the sending, by the first network device, the map element change information to a second network device specifically includes: the map element change information is associated with whether the second network device determines to update an electronic map.

In a possible design, when the first network device is a cloud server, the sending, by the first network device, the map element change information to a second network device specifically includes: the second network device is a road side unit, and the map element change information is associated with whether the second network device determines to update an electronic map.

According to a third aspect, a data transmission apparatus is provided. The apparatus includes: a determining module, configured to determine a data format of detection information, where the detection information is associated with a map element; a sending module, configured to send the detection information of the apparatus to a first network device based on the data format; and a receiving module, configured to receive map element change information sent by the first network device or a second network device.

In a possible design, the data format of the detection information specifically includes: a format 1: original information collected by an on-board sensor, or a format 2: target information detected by a single on-board sensor, or a format 3: target information jointly detected by at least one on-board sensor, or a format 4: map element change information corresponding to target information jointly detected by at least one on-board sensor.

In a possible design, the determining module is specifically configured to: determine the data format of the detection information based on confidence of the detection information; or determine the data format of the detection information based on a map layer supported by the first network device; or determine the data format of the detection information based on a data processing capability of the first network device; or determine the data format of the detection information based on a map element type corresponding to the detection information; or determine the data format of the detection information based on indication information sent by the first network device, where the indication information is used to indicate the data format of the detection information; or determine the data format of the detection information based on a moment for obtaining/sending the detection information.

In a possible design, the map element change information includes at least one of whether the map element exists, or location information, shape information, color information, and size information of the map element.

In a possible design, the original information collected by the on-board sensor includes at least one of laser point cloud data or pixel data.

In a possible design, a map element corresponding to the detection information includes a first type and a second type, and the determining module is specifically configured to: when the map element corresponding to the detection information is the first type, determine that the data format of the detection information is the format 1, the format 2, or the format 3; or when the map element corresponding to the detection information is the second type, determine that the data format of the detection information is the format 4.

In a possible design, the map element of the first type includes at least one of road information, lane line information, traffic light information, road sign information, light pole information, or stop line information.

In a possible design, the first network device is a cloud server or a road side unit.

In a possible design, when the first network device is a road side unit, the second network device is a cloud server, and the map element change information is associated with map element change information uploaded by at least one road side unit to the second network device.

In a possible design, when the first network device is a cloud server, the second network device is a road side unit, and the map element change information is associated with map element change information uploaded by at least one cloud server to the second network device.

According to a fourth aspect, a data transmission apparatus is provided. The apparatus includes: a receiving module, configured to receive detection information sent by a vehicle terminal, where the detection information is associated with a map element; a detection module, configured to: determine, based on the detection information, whether a map element corresponding to the detection information is matched, and if the map element corresponding to the detection information is not matched, obtain map element change information based on the detection information; and a sending module, configured to: send the map element change information to the vehicle terminal; or send the map element change information to a second network device, where the map element change information is used by the second network device to determine whether to update an electronic map.

In a possible design, a data format of the detection information sent by the vehicle terminal is: a format 1: original information collected by an on-board sensor, or a format 2: target information detected by a single on-board sensor, or a format 3: target information jointly detected by at least one on-board sensor, or a format 4: map element change information corresponding to target information jointly detected by at least one on-board sensor.

In a possible design, the sending module is further configured to send indication information to the vehicle terminal, where the indication information is used to indicate a data format of the detection information sent by the vehicle terminal. Alternatively, the sending module is further configured to send, to the vehicle terminal, a map layer supported by the apparatus, to determine a data format of the detection information. Alternatively, the sending module is further configured to send a data processing capability of the apparatus to the vehicle terminal, to determine a data format of the detection information.

In a possible design, the map element change information includes at least one of whether the map element exists, or location information, shape information, color information, and size information of the map element.

In a possible design, the original information collected by the on-board sensor includes at least one of laser point cloud data or pixel data.

In a possible design, when the second network device is a road side unit, the sending module is specifically configured to send the map element change information to a road side unit corresponding to the map element, where the map element change information is used to determine whether an electronic map in an area corresponding to the road side unit is updated.

In a possible design, when the second network device is a cloud server, the sending module is specifically configured to send the map element change information to the cloud server, where the map element change information is used to determine whether an electronic map stored in the cloud server is updated.

According to a fifth aspect, a vehicle terminal is provided. The vehicle terminal includes at least one processor and a memory. The at least one memory stores program instructions and data, the program instructions are executed in the at least one processor, and the at least one processor runs the program instructions in the memory, so that the vehicle terminal performs the data transmission method in any possible design of the first aspect.

According to a sixth aspect, a cloud server is provided. The cloud server includes at least one processor and at least one memory. The at least one memory stores program instructions and data, the program instructions are executed in the at least one processor, and the at least one processor runs the program instructions in the at least one memory, so that the cloud server performs the data transmission method in any possible design of the second aspect.

According to a seventh aspect, a road side unit is provided. The road side unit includes at least one processor and at least one memory. The at least one memory stores program instructions and data, the program instructions are executed in the at least one processor, and the at least one processor runs the program instructions in the at least one memory, so that the road side unit performs the data transmission method in any possible design of the second aspect.

According to an eighth aspect, a communications system is provided. The communications system includes at least one vehicle terminal and at least one first network device, the vehicle terminal is configured to perform the data transmission method in any possible design of the first aspect, and the first network device is configured to perform the data transmission method in any possible design of the second aspect.

According to a ninth aspect, a computer-readable storage medium is provided. The computer-readable storage medium stores instructions, and when the computer-readable storage medium is run on a device, the device is enabled to perform the data transmission method in any possible design of the first aspect.

According to a tenth aspect, a computer program product is provided. When the computer program product is run on a computer, the computer is enabled to perform the data transmission method in any possible design of the first aspect.

According to an eleventh aspect, a computer-readable storage medium is provided. The computer-readable storage medium stores instructions, and when the computer-readable storage medium is run on a device, the device is enabled to perform the data transmission method in any possible design of the second aspect.

According to a twelfth aspect, a computer program product is provided. When the computer program product is run on a computer, the computer is enabled to perform the data transmission method in any possible design of the second aspect.

It may be understood that any data transmission method, apparatus, electronic device, communications system, computer-readable storage medium, and computer program product provided above may be implemented by using corresponding methods provided above. Therefore, for beneficial effects that can be achieved, refer to beneficial effects in the corresponding methods provided above. Details are not described herein again.

DETAILED DESCRIPTION OF ILLUSTRATIVE EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments, unless otherwise specified, "a plurality of" means two or more than two.

A data transmission method provided in the embodiments of this application is mainly applied to data update and maintenance applications of an electronic map of a crowdsourced vehicle, and mainly implements map update in a crowdsourcing mode. Specifically, the crowdsourcing mode means that massive road identification data collected by social vehicles is collected, to process a large amount of road identification data, and match the data against a corresponding map element on an electronic map, so as to complete update of an electronic map database on a map cloud. In this way, a plurality of social vehicles that use the electronic map can perform electronic map update, so as to better guide a driver to drive a vehicle or implement automatic driving.

The map element in the embodiments of this application is a road feature identified on an electronic map and road information used to guide vehicle driving, for example, a traffic light, a traffic pole, a traffic sign, a road sign, a lane line, or a zebra crossing.

Using the crowdsourcing mode to update and maintain a high-definition electronic map can implement fast and timely update of the electronic map, and a large amount of detection data can ensure accuracy of map data update and improve safety of automatic driving.

Figure 1:
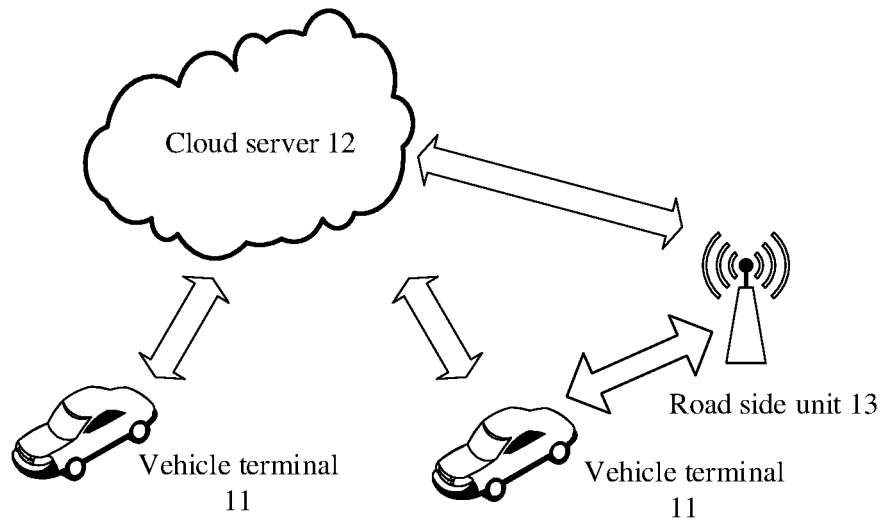
FIG. 1 is a diagram of a system architecture of an implementation environment of a data transmission method according to an embodiment of this application.

The following describes a schematic diagram of an implementation environment according to an embodiment of this application with reference to FIG. 1. FIG. 1 is a schematic diagram of an implementation environment of a crowdsourcing data processing method according to an embodiment of this application. As shown in FIG. 1, this embodiment of this application provides a communications system. The system may include at least one vehicle terminal 11 and a cloud server 12.

The vehicle terminal is a front-end device used for vehicle communication and management, and may be installed in various vehicles. The at least one vehicle terminal 11 may be a communications apparatus in massive social vehicles, or may be a communications apparatus in an intelligent vehicle that has a data processing capability and an identification capability, or may include a common social vehicle and an intelligent vehicle. The crowdsourced vehicle terminal 11 may be used as an important basis for map collection and update, may obtain real-time road detection information by using an on-board sensor configured in the vehicle terminal, for example, by using a camera, an infrared sensor, a radar detector, a global satellite navigation system, or an inertial navigation system (INS), and may upload the detected road information to the cloud server 12 to update and maintain map data in real time. Specifically, the vehicle terminal 11 may upload collected road data or an updated target map element to the cloud server 12 or another network device over a network.

The cloud server 12 may provide real-time map data for the plurality of vehicles 11 over a wireless network. The cloud server 12 includes storage space of a relatively large capacity, which is used to store map data. Specifically, the map data may be deployed on one or more servers. Optionally, in the cloud server 12, a network platform may determine, based on the road data or the updated target map element reported by the crowdsourced vehicle terminal 11, whether to update a current map, and update the map data.

In an embodiment, the communications system may further include a road side unit 13. The road side unit 13 communicates with the vehicle terminal 11 or the cloud server 12 over a wired or wireless network, and may provide a service such as road information within a specific area range, high-precision positioning, or a high-definition map for the vehicle terminal 11. The road side unit 13 may be further configured to collect road detection information reported by the vehicle terminal 11 within a specific area range, and determine, through data processing and fusion, whether a corresponding map element changes, to determine whether to update the map.

An embodiment of this application provides a data transmission method. By obtaining road detection information of an on-board sensor of a crowdsourced vehicle, a vehicle terminal may detect an electronic map change based on detection information detected by the on-board sensor and a related map element in a current electronic map, or a cloud server may detect an electronic map change, or a road side unit may detect an electronic map change. Therefore, the cloud server or the road side unit determines, based on a detection result, whether to update a corresponding map element, and delivers updated map information to the at least one vehicle terminal.

Figure 2:
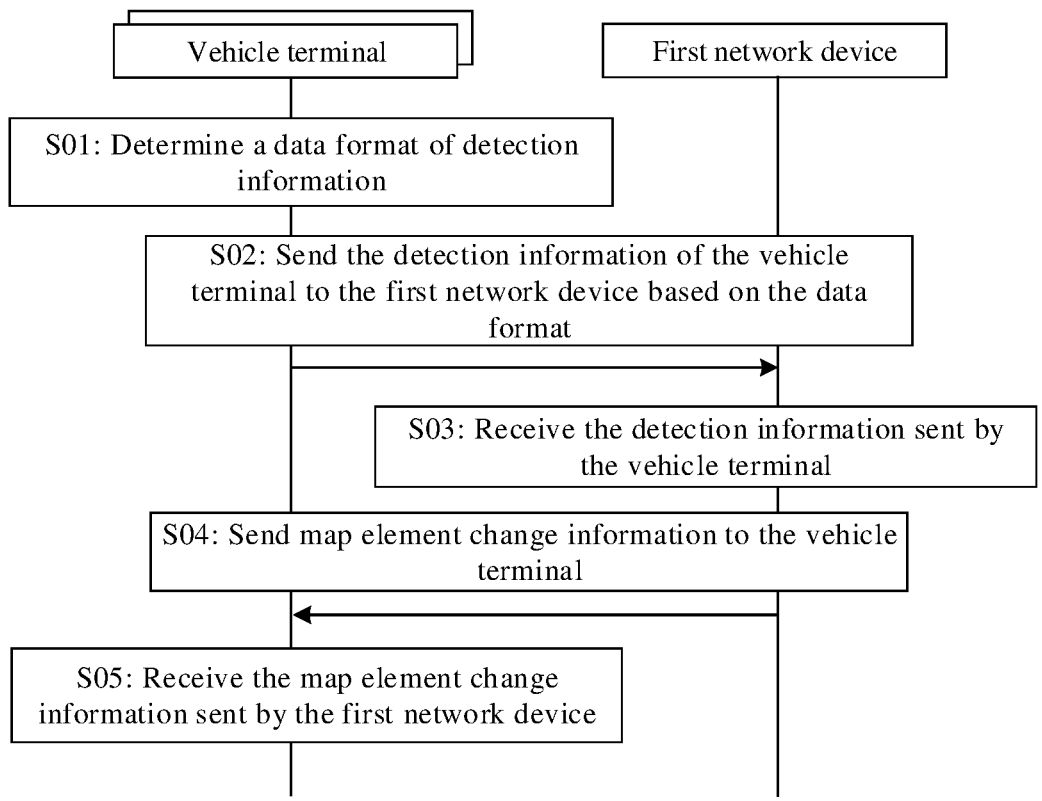
FIG. 2 is a schematic flowchart of a data transmission method according to an embodiment of this application.

With reference to FIG. 1, an embodiment of this application provides a data transmission method, applied to at least one vehicle terminal and a first network device. The first network device may be a cloud server or a road side unit. A processing procedure of the method is shown in FIG. 2, and the method may include the following steps.

S01: The vehicle terminal determines a data format of detection information.

The detection information may be road feature-related detection data collected by an on-board sensor configured in the vehicle terminal. The on-board sensor may include a laser radar, a monocular camera, a multi-cular camera, a millimeter-wave radar, an infrared detector, an antenna, a temperature sensor, a global satellite navigation system, an INS, a somatosensory sensor, a gravity sensor, or the like.

The detection information in this embodiment of this application is mainly road detection information, is obtained by the on-board sensor of the vehicle terminal, and may be used to analyze and indicate detection information of a current road feature. For example, corresponding data processing may be performed on image data that is of a current road and that is obtained by the camera, to identify a road feature in the image data, for example, a road feature such as lane line information, zebra crossing information, and speed limit symbol information. For example, the laser radar may be configured to detect a distance and a size of a target object that currently exists on a road, to identify a road feature based on detection data, for example, traffic pole information, road sign information, and pedestrian information.

In a possible implementation, the data format of the detection information obtained by the on-board sensor of the vehicle terminal includes at least the following four formats:

Format 1: Original information collected by an on-board sensor.

The original information is unprocessed data information directly collected by the on-board sensor, for example, multi-frame laser point cloud data or multi-frame image data, or data information that undergoes only simple data format processing or preprocessing, but does not undergo complex data processing or data identification.

Specifically, the original information collected by the on-board sensor may include laser point cloud data or pixel data. For example, laser point cloud data obtained by the laser radar is a set of vectors of a target object obtained by the laser radar through scanning in a three-dimensional coordinate system.

Pixel data obtained by the camera is information about each pixel included in image data obtained by the camera, for example, an RGB color value, a grayscale value, brightness information, and depth information of each pixel. A computer may generate two-dimensional image data or three-dimensional image data based on the pixel data.

Format 2: Target information detected by a single on-board sensor.

The target information is target information that is used to indicate a road feature and that is identified after data processing is performed on original information obtained by the on-board sensor. For example, the target information may be used to indicate or identify traffic pole information, road sign information, lane line information, and zebra crossing information.

An algorithm for the data processing may include an algorithm in an aspect such as semantic segmentation, clustering analysis, three-dimensional modeling, and computer vision. The original information obtained by the on-board sensor may be processed, to output a three-dimensional model, a lane model, map element information, or the like.

For example, data information collected by the laser radar mainly includes process data such as synchronization time data, positioning data of a global positioning system (GPS), and attitude parameter data of an INS, and result data such as coordinate data and echo intensity data. The following describes an example of a laser point cloud data processing process. Based on this method, scattered point cloud data can be organized, through point cloud segmentation, into a spatial data structure that is easy to understand, accords with the natural law, and has a topological relationship.

1. Process laser ranging data, attitude data of the INS, data of the GPS, and scanning angle data, to calculate three-dimensional coordinate information of a laser corner point.

2. Use some mathematical algorithms to perform data postprocessing such as point cloud data filtering and classification, building edge extraction, and building three-dimensional reconstruction.

3. Transform a point cloud data coordinate system into a coordinate system used by a user.

4. Perform a corresponding operation on a ground point obtained through filtering and classification, to generate a final mapping product such as a digital elevation model (DEM), a digital surface model (DSM), or a digital orthophoto map (DOM).

For example, a presentation format of the target information may be image data, and the image data may include an identifier of a road feature, identification information used to indicate a corresponding map element, or the like. A presentation format of the target information may be alternatively code that can be identified by a computer, and is used to indicate specific data that is of a road feature and that is collected by the on-board sensor, for example, location information, shape information, size information, or text information.

It should be noted that, in this embodiment of this application, the target information and a map element corresponding to the target information on an electronic map may be a standard model uniformly formulated by a crowdsourcing internet of vehicles system, or may be a model customized by a person skilled in the art based on experimental data. This is not specifically limited in this application.

Format 3: Target information jointly detected by at least one on-board sensor.

Format 3 is target information obtained after the vehicle terminal performs data processing and data fusion on the detection information detected by the plurality of on-board sensors. This improves data reliability. For example, a system may superimpose data of a global positioning system (GPS), laser point cloud data, and image data, and identify road features such as a lane line, a curb, a road sign, and a traffic sign through data identification. Data fusion is performed on detection information or target information that is used to indicate a same road feature or a map element, to obtain jointly detected target information.

The vehicle terminal sends the detection information by using the data format. Because fusion and verification are performed on data collected by a plurality of different sensors, reliability and accuracy of the detection information can be improved. In addition, the first network device that receives the detection information does not need to perform data identification and processing. Therefore, data processing complexity of the first network device can be further reduced.

For example, scanning data of the laser radar is processed to obtain target information 1, and the target information 1 may be used to indicate specific information of a speed limit sign and a lane identifier on a currently positioned road. Image data captured by the camera is processed to obtain target information 2, and the target information 2 includes specific information of a speed limit sign and a lane identifier of a currently positioned road. For another piece of target information 3 detected by the on-board sensor, the system may eliminate data with a relatively large error by performing data fusion on the target information 1, the target information 2, and the target information 3, to obtain more accurate target information jointly detected by the plurality of on-board sensors.

In an example of lane line extraction, a data fusion algorithm based on image vision plus a laser radar is as follows:

Step 1: Preprocess an original laser point cloud, extract road surface point cloud data, and preprocess an original image to remove noise, illumination, and the like.

Step 2: Extract point cloud data of a road boundary from the road surface point cloud data extracted in step 1, and determine a point cloud location of a lane line according to a principle that a distance between the lane line and the road boundary is fixed.

Step 3: Register lane line point cloud data obtained after the processing in step 2 with the preprocessed image, and roughly determine an approximate location of the lane line on the image.

Step 4: Perform accurate lane line detection within the image area determined in step 3.

Specifically, fusion may be performed on detection data of a plurality of different on-board sensors by using a deep learning classification algorithm, or by using an artificial intelligence algorithm such as a neural network. This is not specifically limited in this application.

Format 4: Map element change information corresponding to target information jointly detected by at least one on-board sensor.

The map element change information is an updated value or an incremental value of a map element obtained after target information jointly detected by a plurality of on-board sensors is compared with a map element corresponding to the target information on an electronic map, to determine that the map element corresponding to the target information on the current electronic map changes. The electronic map corresponding to the target information is a currently stored electronic map that is being used by a user.

The system may match the target information jointly detected by the plurality of on-board sensors with the map element corresponding to the target information, and if the system determines that the target information does not match the map element, the system may obtain the map element change information of the map element corresponding to the target information through comparison.

For example, the map element change information may include binary semantic information such as whether the map element exists, or location information, shape information, color information, and size information of the map element.

For example, the map element change information may further include relative change information, for example, a location offset of the map element.

It should be noted that, after the vehicle terminal sends the detection information in the foregoing data format, data collected by a plurality of different sensors is fused and compared with a local electronic map. Therefore, reliability and accuracy of the detection information can be improved. In addition, the vehicle terminal performs change detection based on the detection information and the map element on the current electronic map, and generates the map element change information, so that the first network device that receives the detection information does not need to perform data processing and map element change detection. Therefore, data processing complexity of the first network device can be further reduced.

S02: The vehicle terminal sends the detection information of the vehicle terminal to the first network device based on the data format, where the detection information is associated with a map element.

The first network device may be a cloud server or a road side unit (RSU). In an actual map collection application of crowdsourcing internet of vehicles, the plurality of vehicle terminals may send the collected detection information to the first network device, to update and maintain an electronic map.

The detection information is associated with a map element, and may be used to indicate a map element detected by the on-board sensor. Further, the detection information includes detection data in the format 1, the format 2, or the format 3, and may be used by the first network device to determine, based on the detection information, whether a map element corresponding to the detection information on a current electronic map changes. Detection data in the format 4 in the detection information may be used by the first network device to determine, based on confidence of the detection information, whether to update an electronic map.

In a possible implementation, the first network device may be a road side unit, and the plurality of vehicle terminals may send the detection information of the vehicle terminal to the road side unit based on the determined data format.

Because the road side unit is divided based on a map area, the vehicle terminal may separately send, based on location area division, the collected detection information to the road side unit corresponding to the detection information, that is, the road side unit may be a road side unit in a location area corresponding to the detection information. The detection information may be used by the road side unit to determine, based on the detection information, whether the map element corresponding to the detection information on the current electronic map changes.

S03: The first network device receives the detection information sent by the vehicle terminal, and determines, based on the detection information, whether a map element corresponding to the detection information is matched, and if the map element corresponding to the detection information is not matched, the first network device obtains map element change information based on the detection information.

Matching means that it is determined whether the map element corresponding to the detection information is consistent with a corresponding map element on a currently stored electronic map, and if it is determined that the map element changes, it is considered that the detection information does not match the corresponding map element.

The first network device identifies, based on the received detection information, the map element corresponding to the detection information on the electronic map through data processing, that is, determines, based on a map element on a local existing electronic map of the first network device, a map element that matches the detection information. For example, the corresponding map element may be determined by using GPS positioning information included in the detection information. The detection information is compared with the matched map element, to determine whether the current map element changes.

If it is determined that the map element corresponding to the detection information changes, the first network device may obtain the map element change information based on the detection information, and perform step S04. Alternatively, if it is determined that the map element corresponding to the detection information does not change, the first network device performs no operation, or the first network device may return response information to the vehicle terminal. The response information is used to indicate that the map element corresponding to the detection information sent by the vehicle terminal does not change, and the vehicle terminal does not need to update the local electronic map.

In a possible implementation, the first network device may determine, based on the detection information sent by the plurality of vehicle terminals, whether a map element changes, to improve determining accuracy. In addition, the first network device may obtain the map element change information based on the detection information sent by the plurality of vehicle terminals, thereby improving map update accuracy.

In a possible implementation, the first network device may update the local electronic map of the first network device based on the map element change information. The first network device may be a cloud server or a road side unit, and the cloud server or the road side unit may update the local electronic map of the cloud server or the road side unit based on the map element change information. Another network device may obtain, by using the first network device, an electronic map that is updated in real time. For example, when requesting map data from the cloud server, a cloud server of another map vendor may obtain an updated electronic map. A vehicle terminal in an area may obtain an electronic map that is updated in real time from the cloud server by using a road side unit in the area, or directly obtains an electronic map that is updated in real time from the cloud server, thereby improving real-time performance and accuracy of electronic map update.

S04: The first network device sends the map element change information to the vehicle terminal.

The first network device may send the map element change information to the plurality of vehicle terminals, to update local electronic maps of the plurality of vehicle terminals.

In a possible implementation, the first network device may be a cloud server, and the cloud server may send location-matched map element change information to a plurality of vehicle terminals based on positioning addresses and historical track records of massive vehicle terminals. For example, the cloud server may send, based on a location area in which a vehicle terminal is located, map element change information within the area range to a plurality of vehicle terminals whose positioning addresses are within the area range, or to a plurality of vehicle terminals whose historical track records include the area range.

In another possible implementation, the first network device may be a road side unit, and the road side unit may send map element change information within an area to a plurality of vehicle terminals in the area.

S05: The vehicle terminal receives the map element change information sent by the first network device.

After receiving the map element change information sent by the first network device, the vehicle terminal may update the local electronic map based on the received map element change information, to determine a change status of a corresponding map element on the electronic map based on the detection information collected by the crowdsourced vehicle, so as to update and maintain the electronic map in real time.

In this embodiment of this application, the vehicle terminal may send detection information in different data formats to the first network device, for example, the format 2, the format 3, or the format 4. The vehicle terminal undertakes a part of a processing process of performing data fusion on the detection information. Therefore, a data fusion process of detection data of different sensors by a receiving device, that is, the first network device, can be relatively simple, and data processing complexity of the first network device can be effectively reduced.

In an implementation, step S01 in which the vehicle terminal determines a data format of detection information may specifically include the following several different manners, which are separately described in detail below. The system may perform determining in one or more of the following several manners.

Manner 1: The vehicle terminal may determine the data format of the detection information based on confidence of the detection information.

The confidence is also referred to as reliability, a confidence level, a confidence coefficient, or the like. In estimation of population parameters, the confidence indicates a probability that a value of a sampled parameter falls within an allowable error range. That is, in estimation of population parameters through sampling, based on randomness of a sample, a probability representation method is used to represent a corresponding probability that an estimated value and a population parameter fall within an allowable error range, and the corresponding probability is referred to as confidence.

The confidence of the detection information is used to indicate a probability of accuracy of the detection information obtained by the vehicle terminal. Higher confidence of the detection information indicates higher accuracy of the detection information. Lower confidence of the detection information indicates lower accuracy of the detection information.

The vehicle terminal may determine, based on the confidence of the detection information, that the data format of the detection information is one or more of the foregoing formats.

For example, the system of the vehicle terminal may be configured as follows: If the confidence of the detection information obtained by the on-board sensor of the vehicle terminal is greater than a preset confidence threshold, the vehicle terminal determines that the data format of the detection information is the format 3 or the format 4. Alternatively, if the confidence of the detection information obtained by the on-board sensor of the vehicle terminal is less than a preset confidence threshold, the vehicle terminal determines that the data format of the detection information is the format 1 or the format 2.

Manner 2: The vehicle terminal may determine the data format of the detection information based on a map layer supported by the first network device.

The map layer is image information of each layer of an electronic map. Actual space of the electronic map is represented by different map layers and then expressed by overlaying the map layers.

The map layer is a map information classification that includes different elements, different features, or different attributes. For example, the electronic map may include a static layer and a dynamic layer from a perspective of a map element change, the electronic map may include a positioning layer and a positioning feature layer from a perspective of use, and the electronic map may include a laser point cloud layer and an image layer from a perspective of map data.

Based on this, the system of the vehicle terminal may be configured as follows: The vehicle terminal determines, based on the map layer supported by the first network device, that the data format of the detection information is one or more of the foregoing formats. Before the vehicle terminal determines the data format of the detection information, the first network device may send indication information to the vehicle terminal, to indicate the map layer supported by the first network device. For example, the first network device may send the indication information to the vehicle terminal, to indicate that the first network device supports the laser point cloud-based positioning layer.

For example, the system may be configured as follows: When the first network device supports the laser point cloud-based positioning layer, the vehicle terminal determines that the data format of the detection information may be the format 1. Alternatively, when the first network device does not support the laser point cloud-based positioning layer, but supports the image layer or a layer of another type, the vehicle terminal determines that the data format of the detection information may be the format 3 or the format 4.

Manner 3: The vehicle terminal may determine the data format of the detection information based on a data processing capability of the first network device.

The system of the vehicle terminal may be configured as follows: The vehicle terminal determines, based on the data processing capability of the first network device, that the data format of the detection information is one or more of the foregoing formats. Before the vehicle terminal determines the data format of the detection information, the first network device may send indication information to the vehicle terminal, to indicate the data processing capability of the first network device. For example, the first network device may send the indication information to the vehicle terminal, to indicate information used to indicate that the data processing capability of the first network device is strong, relatively strong, or relatively weak, or a score used to indicate the data processing capability of the first network device.

For example, when the data processing capability of the first network device meets a threshold, the vehicle terminal determines that the data format of the detection information may be the format 1 or the format 2. Alternatively, when the data processing capability of the first network device does not meet a threshold, the vehicle terminal determines that the data format of the detection information may be the format 3 or the format 4. The threshold may be configured by the system, or may be preset.

Manner 4: The vehicle terminal may determine the data format based on indication information sent by the first network device, where the indication information is used to indicate the data format of the detection information.

The system of the vehicle terminal may be configured as follows: The vehicle terminal determines, based on the indication information sent by the first network device, that the data format of the detection information is one or more of the foregoing formats. Before the vehicle terminal determines the data format of the detection information, the first network device may send the indication information to the vehicle terminal, to indicate the data format of the detection information sent by the vehicle terminal to the first network device. For example, the first network device may send the indication information to the vehicle terminal, to indicate that the data format of the detection information may be the format 1 or the format 2.

Manner 5: The vehicle terminal may determine the data format of the detection information based on a moment for obtaining the detection information.

The system of the vehicle terminal may be configured as follows: The vehicle terminal determines, based on the moment for obtaining the detection information, that the data format of the detection information is one or more of the foregoing formats.

For example, the system of the vehicle terminal may be configured as follows: When the vehicle terminal determines that a current moment is a moment 1, the data format of the detection information sent by the vehicle terminal to the first network device is the format 1. Alternatively, when the vehicle terminal determines that a current moment is a moment 2, the data format of the detection information sent by the vehicle terminal to the first network device is the format 2. Alternatively, when the vehicle terminal determines that a current moment is a moment 3, the data format of the detection information sent by the vehicle terminal to the first network device is the format 3 or the format 4.

Different data formats corresponding to different moments may be separately configured based on a busy/idle state of the first network device, or based on a busy/idle state or a data processing capability of the vehicle terminal. For example, when the vehicle terminal is in a busy state, the data format of the detection information sent to the first network device may be configured as the format 1. When the vehicle terminal is in an idle state, the data format of the detection information sent to the first network device may be configured as the format 4. The busy state may mean that a plurality of services are currently run in the system of the vehicle terminal, and system running space or a system running capability is less than a preset threshold. The idle state may mean that no service is currently run or a small quantity of services are currently run in the system of the vehicle terminal, and system running space or a system running capability is higher than a preset threshold.

Manner 6: The vehicle terminal may determine the data format of the detection information based on a map element type corresponding to the detection information.

The system of the vehicle terminal may be configured as follows: The vehicle terminal determines, based on the map element type corresponding to the detection information, that the data format of the detection information is one or more of the foregoing formats.

In a possible implementation, the map element corresponding to the detection information may include a first type and a second type. The first type may be a key map element, and the map element of the first type may include road information, lane line information, traffic light information, road sign information, light pole information, or stop line information. The second type may be a non-key map element, for example, roadside building information, green belt information, or a temporary road sign.

For example, the system may be configured as follows: When the map element corresponding to the detection information is the first type, the vehicle terminal determines that the data format of the detection information is the format 1, the format 2, or the format 3. Alternatively, when the map element corresponding to the detection information is the second type, the vehicle terminal determines that the data format of the detection information is the format 4.

A specific configuration method in Manner 1 to Manner 6 may be obtained by a person skilled in the art through calculation based on the data processing capability of the vehicle terminal and with reference to the data processing capability of the first network device and the experimental data, and a configuration parameter may be adjusted, updated, and maintained based on an actual application process. This is not specifically limited in this application.

The system may perform configuration in one of the foregoing several different determining manners of determining the data format of the detection information by the vehicle terminal, that is, may perform configuration in one of the foregoing determining manners, for example, may determine, based on the confidence of the detection information, the data format of the sent detection information. Alternatively, the system may comprehensively consider a plurality of the foregoing several determining manners.

For example, if the vehicle terminal determines that the electronic map of the first network device supports the laser point cloud-based positioning layer, the vehicle terminal determines that the data format of the uploaded detection information may be the format 1, or otherwise, the vehicle terminal further determines, based on whether the confidence of the detection information collected by the sensor is greater than the preset confidence threshold or the data processing capability of the first network device, that the data format of the uploaded detection information may be the format 2 or the format 3.

In this embodiment of this application, the vehicle terminal may send detection information in different data formats to the first network device, so that data processing complexity of a receiving device, that is, the first network device, can be reduced. In addition, with reference to current statuses of a sending device and the receiving device, the system can flexibly select the format of the sent detection data, thereby improving flexibility and accuracy of data processing, and implementing real-time map data collection and update of the crowdsourced vehicle.

Figure 3:
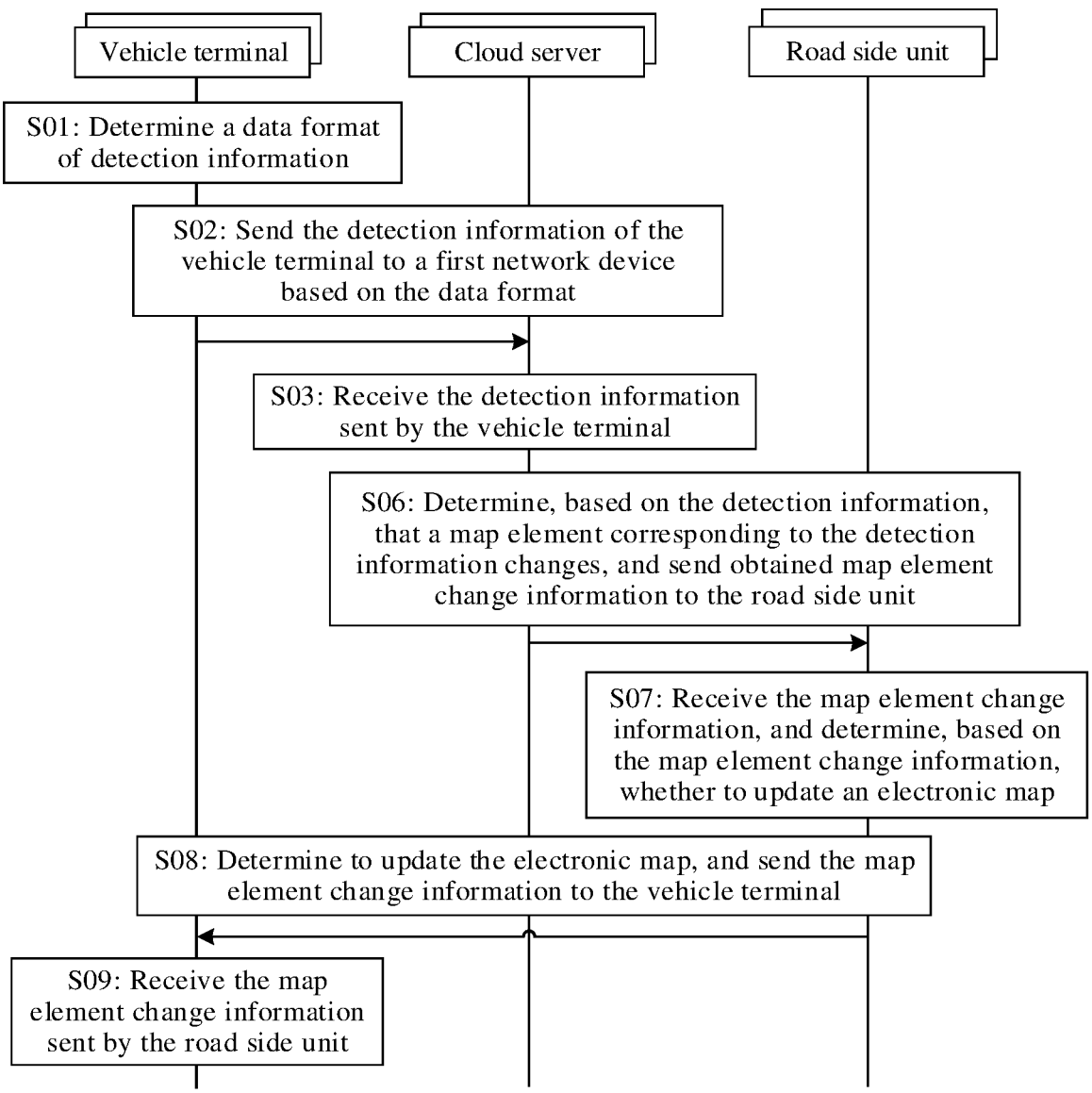
FIG. 3 is a schematic flowchart of another data transmission method according to an embodiment of this application.

In another possible implementation, when the first network device is a cloud server, and a second network device is a road side unit, as shown in FIG. 3, after step S03, the method may further include the following steps.

S06: The cloud server determines, based on the detection information, that the map element corresponding to the detection information changes, and sends the obtained map element change information to the road side unit.

When receiving a plurality of pieces of detection information sent by a plurality of vehicle terminals, the cloud server may perform data identification and data fusion on the detection information, compare the detection information with the currently stored electronic map, and obtain the map element change information when determining that the map element corresponding to the detection information on the currently stored electronic map changes. As described above, the map element change information may be binary semantic information such as whether the map element exists, or may be relative change information of the map element, for example, an incremental value or an updated value.

The cloud server sends the map element change information to the second network device, that is, the road side unit.

Specifically, that the cloud server sends the map element change information to the road side unit is that the cloud server sends, based on an area corresponding to the map element change information, the map element change information to a road side unit associated with the corresponding area.

For example, the plurality of crowdsourced vehicle terminals directly report the detection information in the format 4 to the corresponding map cloud server, that is, the vehicle terminal detects a map element change, and determines the mismatched map element change information. The cloud server performs area classification based on a report result of the crowdsourced vehicle terminal, determines map element change information corresponding to an area, and transmits the map element change information corresponding to the area to a road side unit RSU corresponding to the area.

S07: The road side unit receives the map element change information, and determines, based on the map element change information, whether to update an electronic map.

The road side unit may determine, based on the received map element change information and with reference to confidence of the map element change information, whether to update the electronic map. Specifically, the map element change information is associated with whether the road side unit determines to update the electronic map.

For example, if the road side unit determines that the confidence of the map element change information is higher than confidence of the electronic map currently stored in the road side unit, the road side unit updates the local electronic map of the road side unit based on the map element change information. Alternatively, if the road side unit determines that the confidence of the map element change information is lower than confidence of the electronic map currently stored in the road side unit, the road side unit does not update the electronic map.

In a possible implementation, if a road side unit in an area may receive map element change information sent by map cloud servers of a plurality of different vendors, where the map element change information may be specifically a plurality of pieces of map element change information sent by a plurality of different cloud servers, the road side unit may perform dual verification based on the plurality of pieces of map element change information, thereby improving data accuracy. The plurality of pieces of map element change information are a plurality of pieces of map element change information associated with map elements in a preset management area of the road side unit.

S08: The road side unit determines to update the electronic map, and sends the map element change information to the vehicle terminal.

If the road side unit determines to update the electronic map, the road side unit sends the map element change information obtained after the data fusion to the vehicle terminal, to update the local electronic map of the vehicle terminal.

S09: The vehicle terminal receives the map element change information sent by the road side unit.

After receiving the map element change information sent by the second network device, that is, the road side unit, the vehicle terminal may update the local electronic map based on the map element change information, to determine a change status of a corresponding map element on the electronic map based on the detection information collected by the crowdsourced vehicle, so as to update and maintain the electronic map.

In the foregoing embodiment of this application, the vehicle terminal directly reports the detection information or the mismatched map element change information to the corresponding cloud server, and the cloud server determines map element change information in an area based on a report result of the crowdsourced vehicle terminal, and sends the map element change information to a road side unit corresponding to the area. The road side unit determines whether to update and maintain the electronic map based on information reported by a plurality of different map vendors. In this process, because a cloud server of each map vendor may transmit obtained map element change information to a road side unit of a corresponding area, the road side unit may perform dual verification based on detection results of different cloud servers for a same area, and broadcast the update results to the vehicle terminal, so as to improve reliability of electronic map update.

Figure 4:
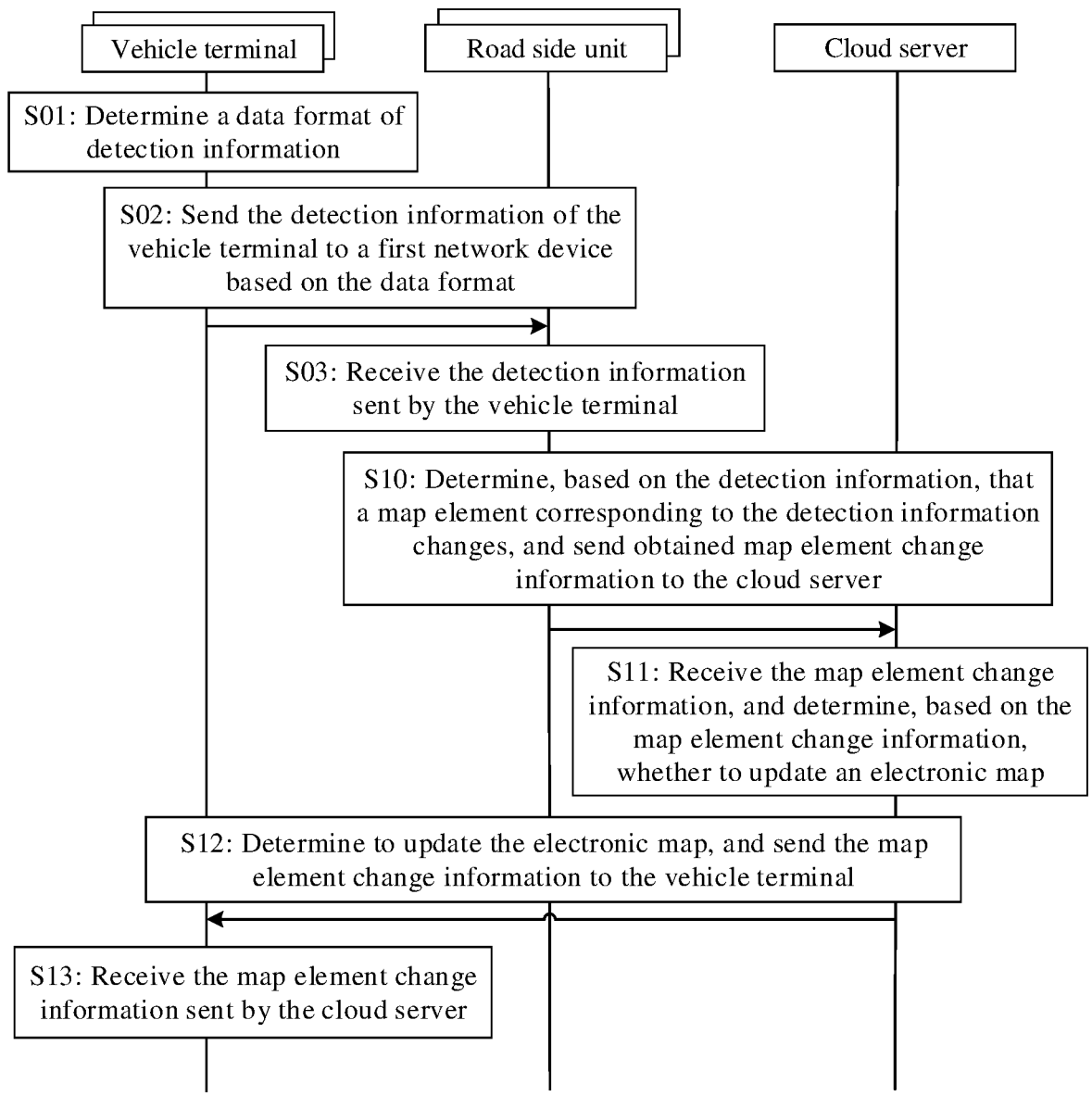
FIG. 4 is a schematic flowchart of another data transmission method according to an embodiment of this application.

In another possible implementation, when the first network device is a road side unit, and the second network device is a cloud server, as shown in FIG. 4, after step S03, the method may further include the following steps.

S10: The road side unit determines, based on the detection information, that the map element corresponding to the detection information changes, and sends the obtained map element change information to the cloud server.

When receiving a plurality of pieces of detection information sent by a plurality of vehicle terminals, the road side unit may perform data identification and data fusion on the plurality of pieces of detection information, compare the detection information with the currently stored electronic map, and obtain the map element change information when determining that the map element corresponding to the detection information on the currently stored electronic map changes. As described above, the map element change information may be binary semantic information such as whether the map element exists, or may be relative change information of the map element, for example, an incremental value or an updated value.

The road side unit sends the map element change information to the second network device, that is, the cloud server.

Different road side units are separately configured to: manage detection information sent by vehicle terminals within a preset area range, or manage detection of changes of map elements within a preset area range. Therefore, different road side units may separately receive road detection information of different areas, and the road side units may separately report map element change information of different management areas to the cloud server after performing data fusion on detection information collected by a plurality of different vehicles and a plurality of different on-board sensors. The cloud server may receive the plurality of map element change information reported by the plurality of different road side units, to maintain and update the electronic map.

S11: The cloud server receives the map element change information, and determines, based on the map element change information, whether to update an electronic map.

The cloud server may determine, based on the received map element change information and with reference to confidence of the map element change information, whether to update the electronic map. Specifically, the map element change information is associated with whether the cloud server determines to update the electronic map.

For example, if the cloud server determines that the confidence of the map element change information is higher than confidence of the electronic map currently stored in the cloud server, the cloud server updates the electronic map stored in the cloud server based on the map element change information. Alternatively, if the cloud server determines that the confidence of the map element change information is lower than confidence of the electronic map currently stored in the cloud server, the cloud server does not update the electronic map.

In a possible implementation, the cloud server may exclude, based on the received plurality of pieces of map element change information reported by the plurality of different road side units, map element change information with a relatively large error according to a verification algorithm and with reference to confidence of the plurality of pieces of map element change information, and obtain data with relatively high reliability and accuracy according to the algorithm, to further determine whether to update the map element associated with the map element change information on the electronic map.

S12: The cloud server determines to update the electronic map, and sends the map element change information to the vehicle terminal.

The cloud server determines to update the electronic map, may obtain the map element change information obtained after the data fusion performed according to the algorithm, and sends the map element change information to the vehicle terminal, to update the local electronic map of the vehicle terminal.

S13: The vehicle terminal receives the map element change information sent by the cloud server.

After receiving the map element change information sent by the second network device, that is, the cloud server, the vehicle terminal may update the local electronic map based on the map element change information, to determine a change status of a corresponding map element on the electronic map based on the detection information collected by the crowdsourced vehicle, so as to update and maintain the electronic map.

In the foregoing embodiment of this application, the road side unit RSU performs data processing and data fusion on the detection information collected by the crowdsourced vehicle in the area of the road side unit RSU, so that reliability of data collection can be improved, and data processing complexity of the cloud server can be reduced, thereby implementing map data collection and update of the crowdsourced vehicle.

In the foregoing several embodiments of this application, a map element change may be detected by the crowdsourced vehicle terminal, the cloud server, or the road side unit, thereby improving data processing flexibility and accuracy. However, the crowdsourced internet of vehicles system may determine, based on factors such as data processing capabilities of a detection information collection device and a map element change detection device, a vehicle terminal, a cloud server, or a road side unit that completes detection of a map element change, and determine whether to update an electronic map based on detection information, and the like. Therefore, accuracy and real-time performance of map data update can be effectively improved, data processing complexity of the cloud server or the road side unit can be further reduced, and security and user experience of automatic driving can be improved.

Figure 5:
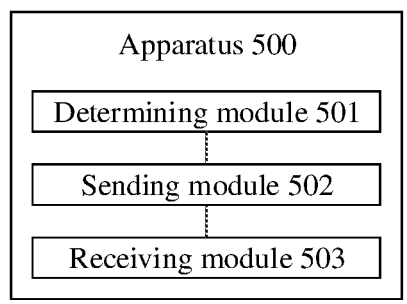
FIG. 5 is a schematic structural diagram of a data transmission apparatus according to an embodiment of this application.

An embodiment of this application further provides a data transmission apparatus. The apparatus may be a vehicle terminal. As shown in FIG. 5, the apparatus 500 includes a determining module 501, a sending module 502, and a receiving module 503.

The determining module 501 may be configured to determine a data format of detection information, where the detection information is associated with a map element.

The sending module 502 may be configured to send, to a first network device based on the determined data format, the detection information collected by the apparatus 500.

The receiving module 503 may be configured to receive map element change information sent by the first network device or a second network device.

In an implementation, the data format of the detection information specifically includes: a format 1: original information collected by an on-board sensor, or a format 2: target information detected by a single on-board sensor, or a format 3: target information jointly detected by at least one on-board sensor, or a format 4: map element change information corresponding to target information jointly detected by at least one on-board sensor.

In an implementation, the determining module 501 may be specifically configured to: determine the data format of the detection information based on confidence of the detection information; or determine the data format of the detection information based on a map layer supported by the first network device; or determine the data format of the detection information based on a data processing capability of the first network device; or determine the data format of the detection information based on a map element type corresponding to the detection information; or determine the data format of the detection information based on indication information sent by the first network device, where the indication information is used to indicate the data format of the detection information; or determine the data format of the detection information based on a moment for obtaining the detection information.

In an implementation, the map element change information includes at least one of whether the map element exists, or location information, shape information, color information, and size information of the map element.

In an implementation, the original information collected by the on-board sensor includes at least one of laser point cloud data or pixel data.

In an implementation, a map element corresponding to the detection information includes a first type and a second type, and the determining module 501 may be specifically configured to: when the map element corresponding to the detection information is the first type, determine that the data format of the detection information is the format 1, the format 2, or the format 3; or when the map element corresponding to the detection information is the second type, determine that the data format of the detection information is the format 4.

In an implementation, the map element of the first type includes at least one of road information, lane line information, traffic light information, road sign information, light pole information, or stop line information.

In an implementation, the first network device may be a cloud server or a road side unit.

In an implementation, when the first network device is a road side unit, the second network device is a cloud server, and the map element change information is associated with map element change information uploaded by at least one road side unit to the second network device.

In an implementation, when the first network device is a cloud server, the second network device is a road side unit, and the map element change information is associated with map element change information uploaded by at least one cloud server to the second network device.

For the apparatus in the foregoing embodiment, a specific manner of performing an operation by each module is described in detail in the embodiments related to the method, and details are not described herein again.

Figure 6:
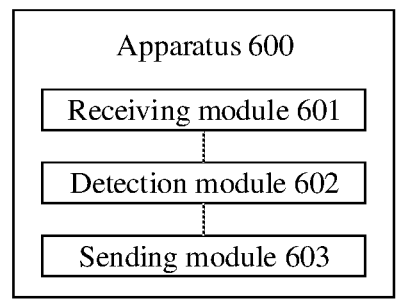
FIG. 6 is a schematic structural diagram of a data transmission apparatus according to an embodiment of this application.

An embodiment of this application further provides a data transmission apparatus. The apparatus may be a cloud server or a road side unit. As shown in FIG. 6, the apparatus 600 may include a receiving module 601, a detection module 602, and a sending module 603.

The receiving module 601 may be configured to receive detection information sent by a vehicle terminal, where the detection information is associated with a map element.

The detection module 602 may be configured to: determine, based on the detection information, whether a map element corresponding to the detection information is matched, and if the map element corresponding to the detection information is not matched, obtain map element change information based on the detection information.

The sending module 603 may be configured to: send the map element change information to the vehicle terminal; or send the map element change information to a second network device, where the map element change information is used by the second network device to determine whether to update an electronic map.

In an implementation, a data format of the detection information sent by the vehicle terminal is: a format 1: original information collected by an on-board sensor, or a format 2: target information detected by a single on-board sensor, or a format 3: target information jointly detected by at least one on-board sensor, or a format 4: map element change information corresponding to target information jointly detected by at least one on-board sensor.

In an implementation, the sending module 603 may be further configured to: send indication information to the vehicle terminal, where the indication information is used to indicate a data format of the detection information sent by the vehicle terminal; or send, to the vehicle terminal, a map layer supported by the apparatus 600, to determine a data format of the detection information; or send a data processing capability of the apparatus to the vehicle terminal, to determine a data format of the detection information.

In an implementation, the map element change information includes at least one of whether the map element exists, or location information, shape information, color information, and size information of the map element.

In an implementation, the original information collected by the on-board sensor includes at least one of laser point cloud data or pixel data.

In an implementation, when the second network device is a road side unit, the sending module 603 may be further specifically configured to send the map element change information to a road side unit corresponding to the map element, where the map element change information is used to determine whether an electronic map in an area corresponding to the road side unit is updated.

In an implementation, when the second network device is a cloud server, the sending module 603 may be further specifically configured to send the map element change information to the cloud server, where the map element change information is used to determine whether an electronic map stored in the cloud server is updated.

For the apparatus in the foregoing embodiment, a specific manner of performing an operation by each module is described in detail in the embodiments related to the method, and details are not described herein again.

Figure 7:
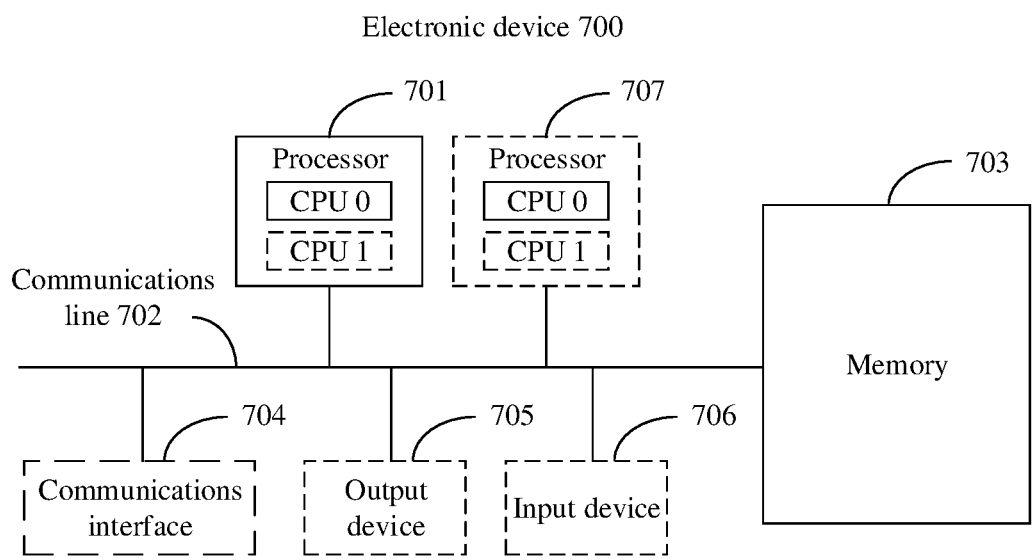
FIG. 7 is a schematic structural diagram of an electronic device according to an embodiment of this application.

An embodiment of this application further provides an electronic device. As shown in FIG. 7, the electronic device 700 may include at least one processor 701, a communications line 702, and a memory 703.

The processor 701 may be a general-purpose central processing unit (CPU), a microprocessor, an application-specific integrated circuit (ASIC), or one or more integrated circuits configured to control program execution in the solutions of this disclosure.

The communications line 702 may include a path such as a bus for transferring information between the components described above.

The memory 703 may be a read-only memory (ROM) or another type of static storage device capable of storing static information and instructions, or a random access memory (RAM) or another type of dynamic storage device capable of storing information and instructions. Alternatively, the memory 703 may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited herein. The memory may exist independently and is connected to the processor through the communications line 702. The memory may alternatively be integrated with the processor. The memory provided in the embodiments of this disclosure may be usually a non-volatile memory. The memory 703 is configured to store computer-executable instructions for executing the solutions of this disclosure, and the processor 701 controls the execution. The processor 701 is configured to execute the computer-executable instructions stored in the memory 703, to implement the method provided in the embodiments of this disclosure.

Optionally, the computer-executable instructions in the embodiments of this disclosure may also be referred to as application program code. This is not specifically limited in the embodiments of this disclosure.

In specific implementation, in an embodiment, the processor 701 may include one or more CPUs, for example, a CPU 0 and a CPU 1 in FIG. 7.

In specific implementation, in an embodiment, the electronic device 700 may include a plurality of processors, for example, the processor 701 and a processor 707 in FIG. 7. Each of these processors may be a single-core (single-CPU) processor or a multi-core (multi-CPU) processor. The processor herein may refer to one or more devices, circuits, and/or processing cores configured to process data (for example, computer program instructions).

In specific implementation, in an embodiment, the electronic device 700 may further include a communications interface 704. The communications interface 704 is configured to communicate with another device or a communications network such as the Ethernet, a radio access network (RAN), or a wireless local area network (WLAN) by using any apparatus such as a transceiver.

In a specific implementation, in an embodiment, the electronic device 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, or a projector. The input device 706 communicates with the processor 701, and may receive an input of a user in a plurality of manners. For example, the input device 706 may be a mouse, a keyboard, a touchscreen device, or a sensing device.

In specific implementation, the electronic device 700 may be a desktop computer, a portable computer, a network server, a palmtop computer (personal digital assistant, PDA), a mobile phone, a tablet computer, a vehicle-mounted computer, a wireless terminal device, an embedded device, or a device with a structure similar to that in FIG. 7. A type of the electronic device 700 is not limited in the embodiments of this disclosure.

In some embodiments, the processor 701 in FIG. 7 may invoke the computer-executable instruction stored in the memory 703, so that the apparatus 700 performs the data transmission method in the foregoing method embodiment.

For example, a function/an implementation process of the determining module 501 in FIG. 5 or the detection module 602 in FIG. 6 may be implemented by the processor 701 in FIG. 7 by invoking the computer-executable instructions stored in the memory 703.

In an example embodiment, a storage medium including instructions is further provided, for example, the memory 703 including the instructions. The instructions may be executed by the processor 701 of the electronic device 700 to complete the foregoing method.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus.

A person skilled in the art can easily figure out another implementation solution of this disclosure after considering the specification and practicing the present invention that is disclosed herein. This application is intended to cover any variations, functions, or adaptive changes of this disclosure. These variations, functions, or adaptive changes comply with general principles of this disclosure, and include common knowledge or a commonly used technical means in the technical field that is not disclosed in this disclosure. The specification and the embodiments are merely considered as examples, and the actual scope of this disclosure are pointed out by the following claims.

It should be finally noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A method, comprising:
   determining, by a vehicle terminal, a data format of detection information detected by the vehicle terminal, wherein the detection information is associated with a map element of a map;
   sending, by the vehicle terminal, the detection information to a first network device; and
   receiving, by the vehicle terminal in response to sending the detection information, map element change information from the first network device or a second network device, wherein the map element change information indicates whether the map element of the map has changed;
   wherein the data format of the detection information is determined based on a map element type corresponding to the detection information; and
   wherein determining the data format of the detection information comprises distinguishing between whether the map element type corresponding to the detection information corresponds to a first map element type and whether the map element type corresponding to the detection information corresponds to a second map element type;
   wherein the first map element type corresponds to first, second and third data formats; and
   wherein the second map element corresponds to a fourth data format.

2. The method according to claim 1, wherein the data format of detection information is determined based on one of following:
   confidence of the detection information,
   a map layer supported by the first network device,
   a data processing capability of the first network device,
   a map element type corresponding to the detection information,
   indication information sent by the first network device indicating the data format of the detection information, or
   a moment for obtaining the detection information.

3. The method according to claim 1, wherein the first map element type comprises at least one of:
   road information,
   lane line information,
   traffic light information,
   road sign information,
   light pole information, or
   stop line information.

4. The method according to claim 1, wherein the map element change information comprises information regarding at least one of following:
   whether the map element exists,
   location information of the map element,
   shape information of the map element,
   color information of the map element, or
   size information of the map element.

5. The method according to claim 1, wherein the first network device is a cloud server or a road side unit.

6. The method according to claim 1, wherein the first network device is a road side unit, the second network device is a cloud server, and the map element change information is associated with map element change information uploaded by at least one road side unit to the second network device.

7. The method according to claim 1, wherein the first network device is a cloud server, the second network device is a road side unit, and the map element change information is associated with map element change information uploaded by at least one cloud server to the second network device.

8. The method according to claim 1, wherein the first data format corresponds to detection information comprising original information collected by an on-board sensor of the vehicle terminal;
   wherein the second data format corresponds to detection information comprising target information detected by a single on-board sensor of the vehicle terminal;
   wherein the third data format corresponds to detection information comprising target information jointly detected by at least two on-board sensors of the vehicle terminal; and
   wherein the fourth data format corresponds to detection information comprising map element change information corresponding to target information jointly detected by at least two on-board sensors of the vehicle terminal.

9. The method according to claim 8, wherein the original information collected by the on-board sensor comprises at least one of laser point cloud data or pixel data.

10. A method comprising:
    receiving, by a first network device, detection information from a vehicle terminal, wherein the detection information is associated with a map element of a map;
    determining, by the first network device based on the detection information, that information of the map element associated with the detection information fails to match the detection information, and based thereon, obtaining, by the first network device, map element change information based on the detection information, wherein the map element change information indicates that the map element of the map has changed; and
    sending, by the first network device, the map element change information to the vehicle terminal or a second network device;
    wherein the detection information has a data format out of a plurality of data formats, wherein respective detection information corresponds to respective data formats of the plurality of data formats, and wherein the plurality of data formats includes:
       a first data format corresponding to detection information comprising original information collected by an on-board sensor of the vehicle terminal;
       a second data format corresponding to detection information comprising target information detected by a single on-board sensor of the vehicle terminal;
       a third data format corresponding to detection information comprising target information jointly detected by at least two on-board sensors of the vehicle terminal; and
       a fourth data format corresponding to detection information comprising map element change information corresponding to target information jointly detected by at least two on-board sensors of the vehicle terminal.

11. The method according to claim 10, wherein the original information collected by the on-board sensor comprises at least one of laser point cloud data or pixel data.

12. The method according to claim 10, wherein the method further comprises:
    sending, by the first network device to the vehicle terminal, one of following information for determining the data format of the detection information:

indication information indicating the data format,
a map layer supported by the first network device, or
a data processing capability of the first network device.

13. The method according to claim 10, wherein the map element change information comprises information regarding at least one of following:
whether the map element exists,
location information of the map element,
shape information of the map element,
color information of the map element, or
size information of the map element.

14. The method according to claim 10, wherein the first network device is a cloud server or a road side unit.

15. The method according to claim 10, wherein the first network device is a road side unit, the second network device is a cloud server, and the map element change information is associated with whether the second network device determines to update an electronic map.

16. The method according to claim 10, wherein the first network device is a cloud server, the second network device is a road side unit, and the map element change information is associated with whether the second network device determines to update an electronic map.

17. An apparatus, comprising:
at least one processor; and
at least one non-transitory memory having program instructions stored thereon;
wherein the at least one processor is coupled to the at least one memory and configured to execute the program instructions to facilitate performance of the following by the apparatus:
determining a data format of detection information detected by the apparatus, wherein the detection information is associated with a map element of a map;
sending the detection information of the apparatus to a first network device; and
receiving, in response to sending the detection information, map element change information from the first network device or a second network device, wherein the map element change information indicates whether the map element of the map has changed;
wherein the data format of the detection information is determined based on a map element type corresponding to the detection information; and wherein determining the data format of the detection information comprises distinguishing between whether the map element type corresponding to the detection information corresponds to a first map element type and whether the map element type corresponding to the detection information corresponds to a second map element type;
wherein the first map element type corresponds to first, second and third data formats; and
wherein the second map element corresponds to a fourth data format.

18. The apparatus according to claim 17, wherein the data format of detection information is determined based on one of following:
confidence of the detection information,
a map layer supported by the first network device,
a data processing capability of the first network device,
a map element type corresponding to the detection information,
indication information sent by the first network device indicating the data format of the detection information, or
a moment for obtaining the detection information.

19. The apparatus according to claim 17, wherein the map element of the first type comprises at least one of:
road information,
lane line information,
traffic light information,
road sign information,
light pole information, or
stop line information.

20. The apparatus according to claim 17, wherein the map element change information comprises information regarding at least one of following:
whether the map element exists,
location information of the map element,
shape information of the map element,
color information of the map element, or
size information of the map element.

21. The apparatus according to claim 17, wherein the first network device is a cloud server or a road side unit.

22. The apparatus according to claim 17, wherein the first network device is a road side unit, the second network device is a cloud server, and the map element change information is associated with map element change information uploaded by at least one road side unit to the second network device.

23. The apparatus according to claim 17, wherein the first network device is a cloud server, the second network device is a road side unit, and the map element change information is associated with map element change information uploaded by at least one cloud server to the second network device.

24. The apparatus according to claim 17, wherein the first data format corresponds to detection information comprising original information collected by an on-board sensor of the vehicle terminal;
wherein the second data format corresponds to detection information comprising target information detected by a single on-board sensor of the vehicle terminal;
wherein the third data format corresponds to detection information comprising target information jointly detected by at least two on-board sensors of the vehicle terminal; and
wherein the fourth data format corresponds to detection information comprising map element change information corresponding to target information jointly detected by at least two on-board sensors of the vehicle terminal.

25. The apparatus according to claim 24, wherein the original information collected by the on-board sensor comprises at least one of laser point cloud data or pixel data.

26. An apparatus, comprising:
at least one processor; and
at least one non-transitory memory having program instructions stored thereon;
wherein the at least one processor is coupled to the at least one memory and is configured to execute the program instructions to facilitate performance of the following by the apparatus:
receiving detection information from a vehicle terminal, wherein the detection information is associated with a map element of a map;
determining, based on the detection information, that information of the map element associated with the detection information fails to match the detection information, and based on thereon, obtaining map element change information based on the detection information, wherein the map element change information indicates that the map element of the map has changed; and sending the map element change information to the vehicle terminal or a second network device;

wherein the detection information has a data format out of a plurality of data formats, wherein respective detection information corresponds to respective data formats of the plurality of data formats, and wherein the plurality of data formats includes:
  a first data format corresponding to detection information comprising original information collected by an on-board sensor of the vehicle terminal;
  a second data format corresponding to detection information comprising target information detected by a single on-board sensor of the vehicle terminal;
  a third data format corresponding to detection information comprising target information jointly detected by at least two on-board sensors of the vehicle terminal; and
  a fourth data format corresponding to detection information comprising map element change information corresponding to target information jointly detected by at least two on-board sensors of the vehicle terminal.

27. The apparatus according to claim 26, wherein the original information collected by the on-board sensor comprises at least one of laser point cloud data or pixel data.

28. The apparatus according to claim 26, wherein the at least one processor is further configured to execute the program instructions to facilitate performance of the following by the apparatus:
  sending, to the vehicle terminal, one of following information for determining the data format of the detection information:
    indication information indicating the data format,
    a map layer supported by the apparatus, or
    a data processing capability of the apparatus.

29. The apparatus according to claim 26, wherein the map element change information comprises information regarding at least one of following:
  whether the map element exists,
  location information of the map element,
  shape information of the map element,
  color information of the map element, or
  size information of the map element.

30. The apparatus according to claim 26, wherein the apparatus is a cloud server or a road side unit.

31. The apparatus according to claim 26, wherein the apparatus is a road side unit, the second network device is a cloud server, and the map element change information is associated with whether the second network device determines to update an electronic map.

32. The apparatus according to claim 26, wherein the apparatus is a cloud server, the second network device is a road side unit, and the map element change information is associated with whether the second network device determines to update an electronic map.

33. A non-transitory computer-readable medium having computer-executable instructions stored thereon, wherein the computer-executable instructions, when executed, facilitate performance of the following:
  determining a data format of detection information detected by the apparatus, wherein the detection information is associated with a map element of a map;
  sending the detection information of the apparatus to a first network device; and
  receiving, in response to sending the detection information, map element change information from the first network device or a second network device, wherein the map element change information indicates whether the map element of the map has changed,
  wherein the data format of the detection information is determined based on a map element type corresponding to the detection information; and wherein determining the data format of the detection information comprises distinguishing between whether the map element type corresponding to the detection information corresponds to a first map element type and whether the map element type corresponding to the detection information corresponds to a second map element type;
  wherein the first map element type corresponds to first, second and third data formats; and
  wherein the second map element corresponds to a fourth data format.

34. The non-transitory computer-readable medium according to claim 33, wherein the data format of detection information is determined based on one of following:
  confidence of the detection information,
  a map layer supported by the first network device,
  a data processing capability of the first network device,
  a map element type corresponding to the detection information,
  indication information sent by the first network device indicating the data format of the detection information, or
  a moment for obtaining the detection information.

35. A non-transitory computer-readable medium having computer-executable instructions stored thereon, wherein the computer-executable instructions, when executed, facilitate performance of the following:
  receiving detection information from a vehicle terminal, wherein the detection information is associated with a map element of a map;
  determining, based on the detection information, that information of the map element associated with the detection information fails to match the detection information, and based thereon, obtaining map element change information based on the detection information, wherein the map element change information indicates that the map element of the map has changed; and
  sending, the map element change information to the vehicle terminal or a second network device;
  wherein the detection information has a data format out of a plurality of data formats, wherein respective detection information corresponds to respective data formats of the plurality of data formats, and wherein the plurality of data formats includes:
    a first data format corresponding to detection information comprising original information collected by an on-board sensor of the vehicle terminal;
    a second data format corresponding to detection information comprising target information detected by a single on-board sensor of the vehicle terminal;
    a third data format corresponding to detection information comprising target information jointly detected by at least two on-board sensors of the vehicle terminal; and
    a fourth data format corresponding to detection information comprising map element change information corresponding to target information jointly detected by at least two on-board sensors of the vehicle terminal.

36. The non-transitory computer-readable medium according to claim 35, wherein the computer-executable instructions, when executed, further facilitate performance of the following:

sending, to the vehicle terminal, one of following information for determining the data format of the detection information:
indication information indicating the data format,
a map layer supported by the apparatus, or
a data processing capability of the apparatus.

* * * * *